Oct. 21, 1930.  H. E. SHELLER  1,779,219
STEERING WHEEL
Filed July 11, 1929  2 Sheets-Sheet 1
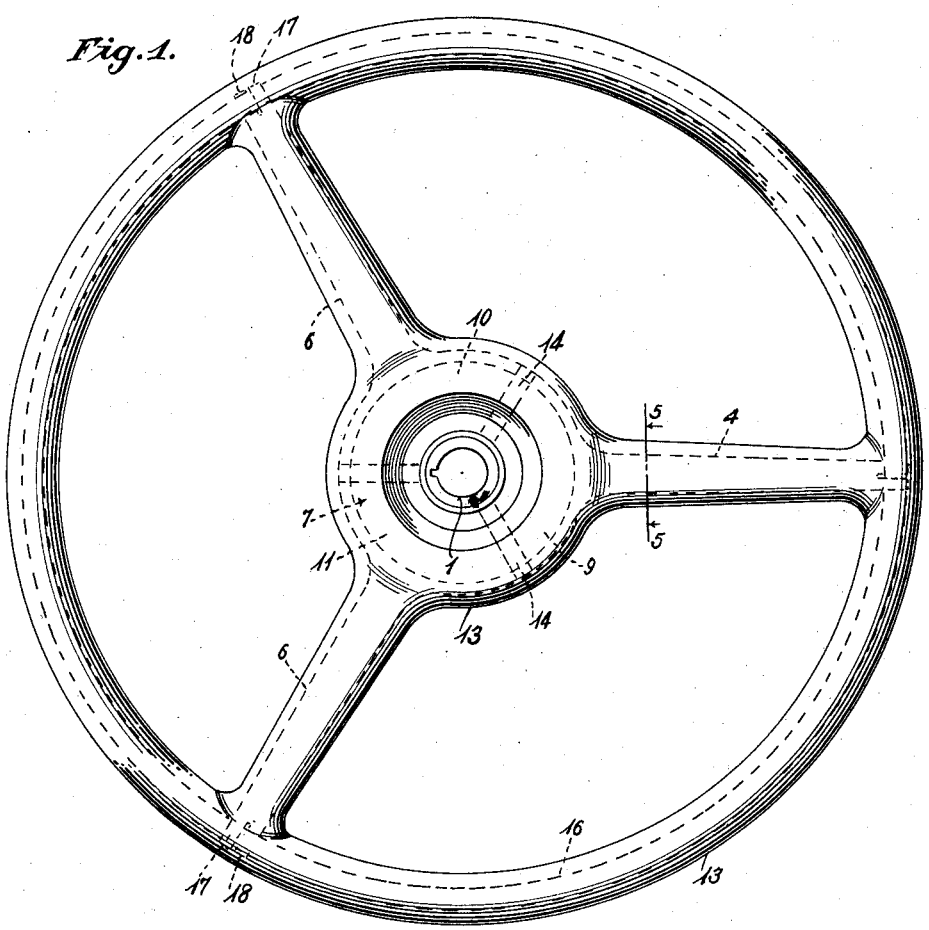
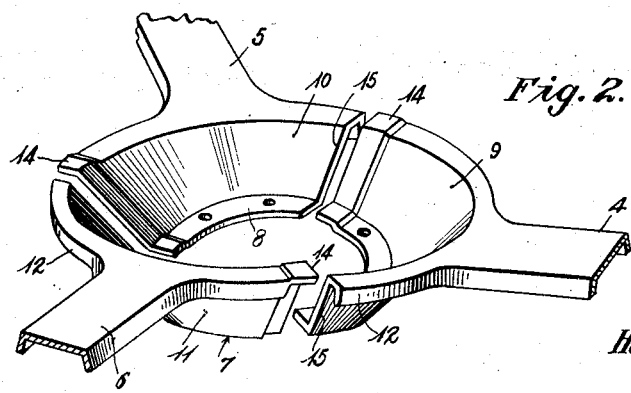
Inventor
Harry E. Sheller
By Bacon & Thomas
Attorneys Oct. 21, 1930.    H. E. SHELLER    1,779,219
STEERING WHEEL
Filed July 11, 1929    2 Sheets-Sheet 2
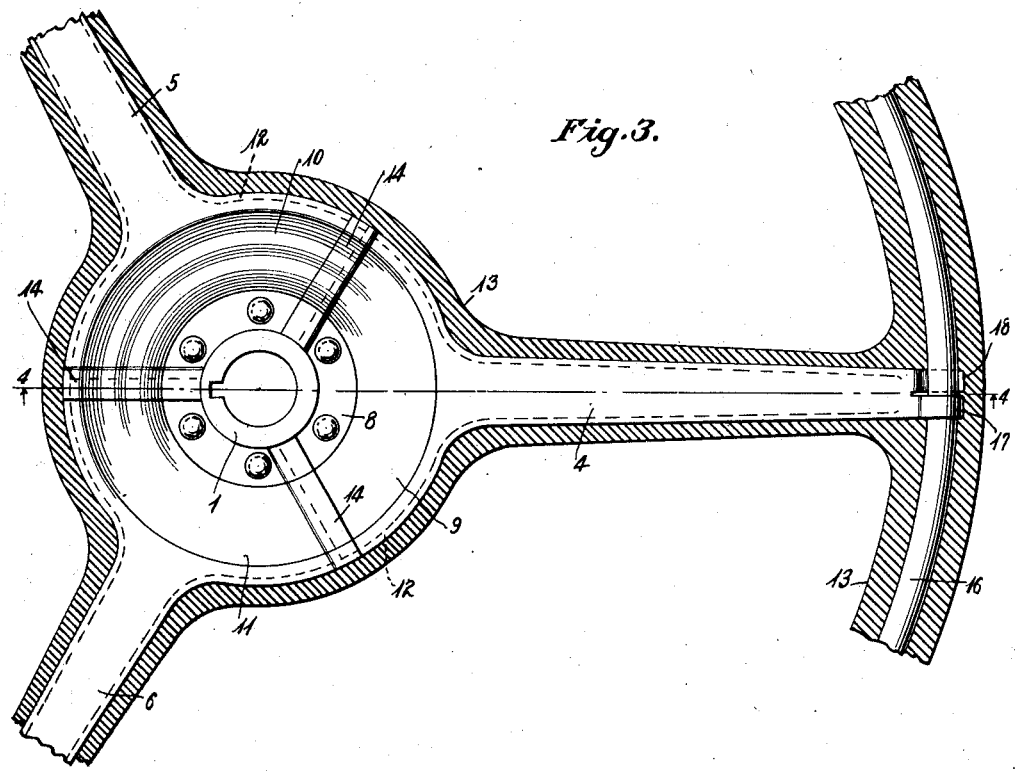
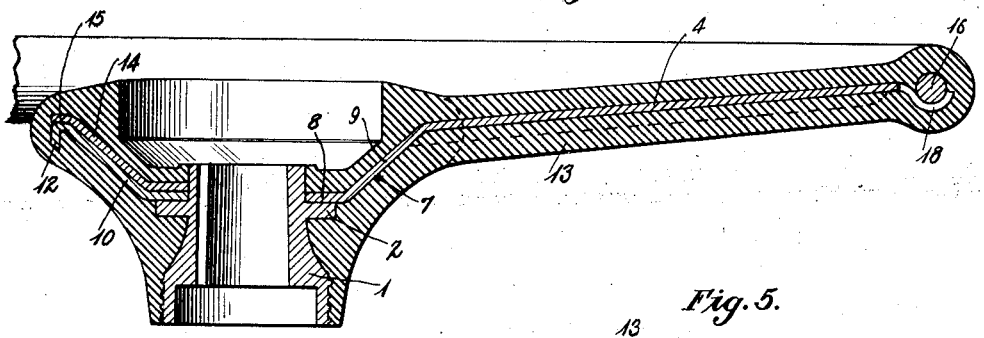
Inventor
Harry E. Sheller
By Bacon & Thomas
Attorneys Patented Oct. 21, 1930

1,779,219

UNITED STATES PATENT OFFICE

HARRY E. SHELLER, OF PORTLAND, INDIANA, ASSIGNOR TO SHELLER WOOD RIM MANUFACTURING COMPANY, INC., OF PORTLAND, INDIANA, A CORPORATION OF INDIANA

STEERING WHEEL

Application filed July 11, 1929. Serial No. 377,448.

This invention relates to steering wheels, particularly for automobiles or similar uses.

An object of the invention is to provide a steering wheel structure of few parts and of inexpensive fabrication which will be rigid and durable in use.

A particular object of the invention is to provide a novel form of web construction for attachment to the hub.

A further object of the invention is to provide the individual spokes with integral sections, which when assembled produce a spider of rigid formation and of a construction adapted to have composition material such as hard rubber applied thereto as a unitary part thereof.

Other and more subordinate objects will be apparent to those skilled in the art from a reading of the following specification taken in conjunction with the drawings attached hereto and forming a part hereof in which Figure 1 is a side elevation of the wheel;

Figure 2 is a detail view, partly in section, of the frame work;

Figure 3 is a portion of a longitudinal section

Figure 4 represents a view on lines 4—4 of Fig. 3 showing in cross section the construction of the wheel; while Fig. 5 is a cross-section view of one of the spokes.

Referring now more specifically to the drawings, the reference numeral 1 indicates a hub having a peripheral flange 2. The spider, as the term is used herein, includes the spokes 4, 5 and 6 and the cup-shaped web 7. This web as will be seen from the drawings has a horizontal extension 8 which is adapted to be riveted or otherwise secured to the hub flange 2. Each of the spokes 4, 5 and 6 is provided with integral or rigid sections 9, 10 and 11. These sections when assembled form a cup-shaped web. These sections have downwardly extending flanges 12, on either side of each of the spokes, for the purpose of lending strength thereto and of securely interlocking with the composition covering 13. Integral with one marginal edge of each of said sections is a side wing or flange 14 which extends over and is secured by welding to the inner face of the adjoining section as shown by 15. Preferably these flanges of the sections are secured to the adjacent sections by welding at the upper edges thereof as shown at 15. It will be obvious that the flanges form a still further means for interlocking with the composition rubber molded thereon. In the form shown I have illustrated only three spokes with their connecting web sections but obviously a greater number of spokes may be employed if desired. However, it has been found that three spokes lend sufficient strength to the structure when manufactured in accordance herewith, thus effecting a great economy in the manufacture of the wheels. The spokes 4, 5 and 6 may be connected to a ring 16 in any desirable manner as for instance by the fingers 17 and 18 extending above and below the same. The entire structure including the ring, spokes, web and hub is completely surrounded by composition material such as hard rubber. Preferably the spokes are of channel shaped cross section in order to impart strength to the structure.

While I have shown and illustrated one form of my invention it will be apparent that I do not desire to be limited to the details thereof and that I fully appreciate that changes may be made without departing from the spirit of the invention as defined in the following claims.

Having thus described my invention what I claim is:

1. A steering wheel comprising a hub, a spider composed of a plurality of spokes and a web portion, said spokes having rigidly secured thereto web sections forming when assembled a cup-like structure, means for securing the web to the hub and means for connecting the edges of said sections together to form a unitary rigid structure and a composition covering secured to said spider and covering the hub, web and spokes thereof.

2. A steering wheel of the character described comprising a spider including a plurality of spokes and a web, a hub, means for securing the web thereto, said spokes having integral downwardly extending web sections forming when assembled a cup-like web and provided with wings bridging the space between the adjacent edges of the sections and secured thereto and a composition covering surrounding the spider, web and hub.

3. A steering wheel of the class described comprising a plurality of spokes terminating at their inner extremities in cup-like sections, a ring and means for securing the outer extremities of the spokes thereto, said sections forming when assembled a cup-shaped web adapted to be secured to the hub, means for preventing relative movement of said sections including integral wings spanning the space between the sections and secured thereto and a composition covering surrounding the hub, web, spokes and ring.

4. A steering wheel of the class described comprising a spider formed of a plurality of spokes, a ring and means for securing the outer portions of the spokes thereto, the spokes having sections rigid therewith and forming in assembled condition a cup-shaped web, said sections having a downwardly extending outer flange, means for connecting the marginal edges of the sections together, and a composition covering applied to the spider, spokes and ring.

5. A steering wheel of the class described, comprising a spider having a plurality of spokes, a ring and means for securing the spokes to the ring, said spokes having integral sections at the inner portions thereof depending downwardly and thence horizontally and provided with outer downwardly extending flanges for interlocking connection with composition rubber applied thereto, means for securing the said sections together including side flanges secured to the edges of said sections and welded to the adjacent sections, a hub and means for securing the said spoke sections to the hub.

In testimony whereof I affix my signature.

HARRY E. SHELLER.